Sept. 22, 1970     J. PARMESON     3,529,376
ACTIVATOR FOR FISHING LURES
Filed July 19, 1968     3 Sheets-Sheet 1
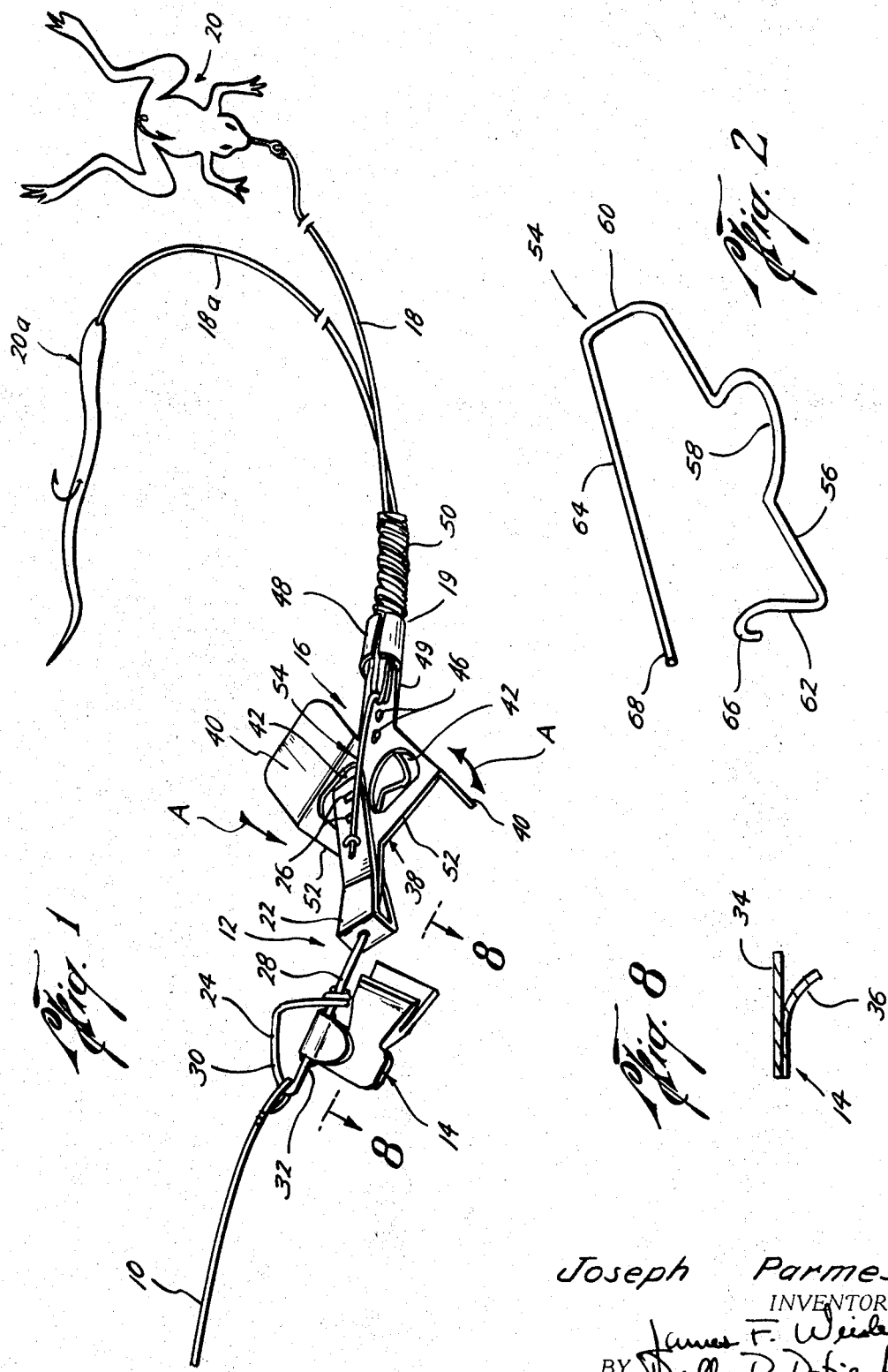
Joseph Parmeson
INVENTOR.
BY James F. Weisler
Dudley R. Dobie, Jr.
Henry W. Hope
ATTORNEYS

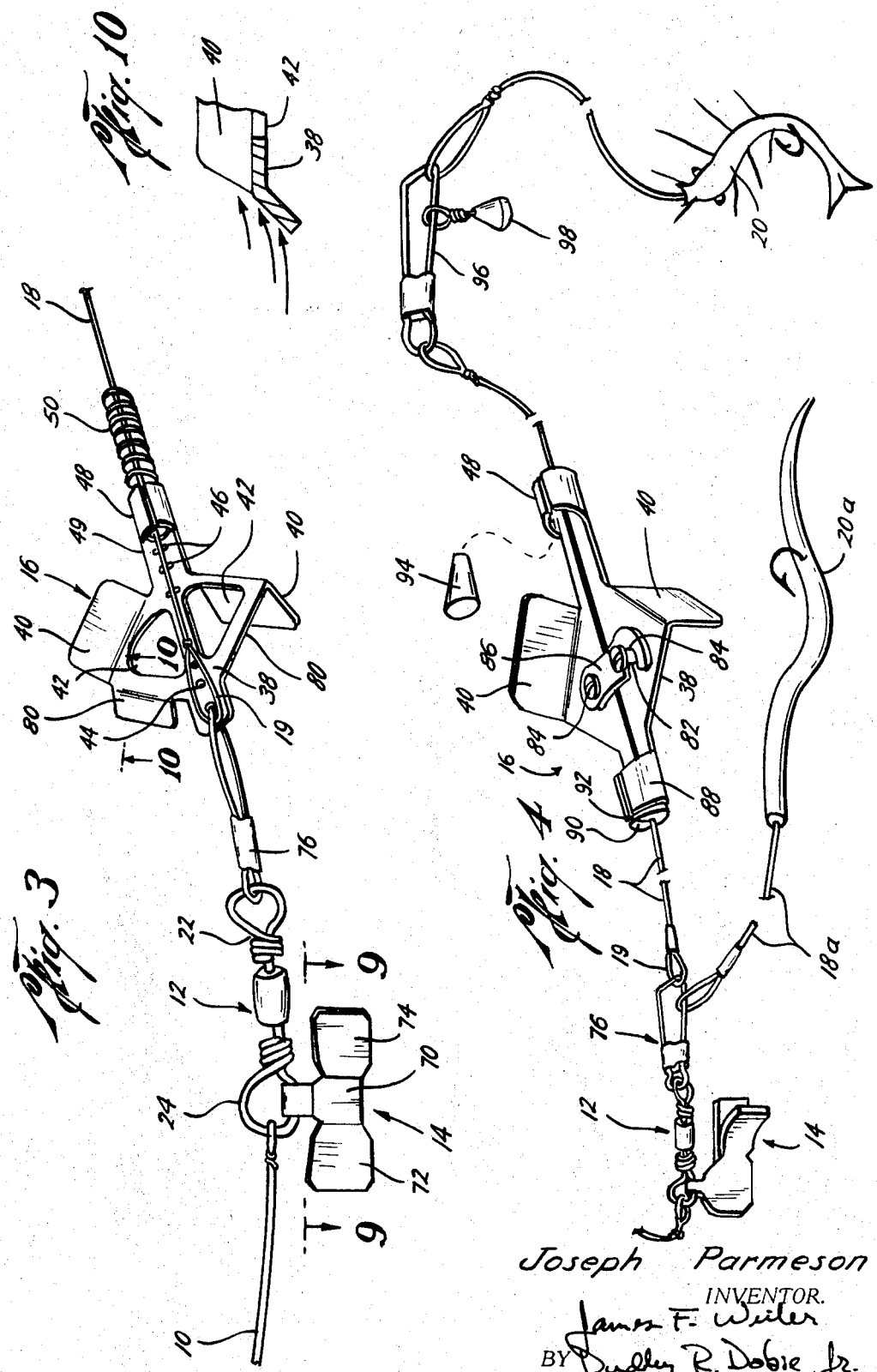

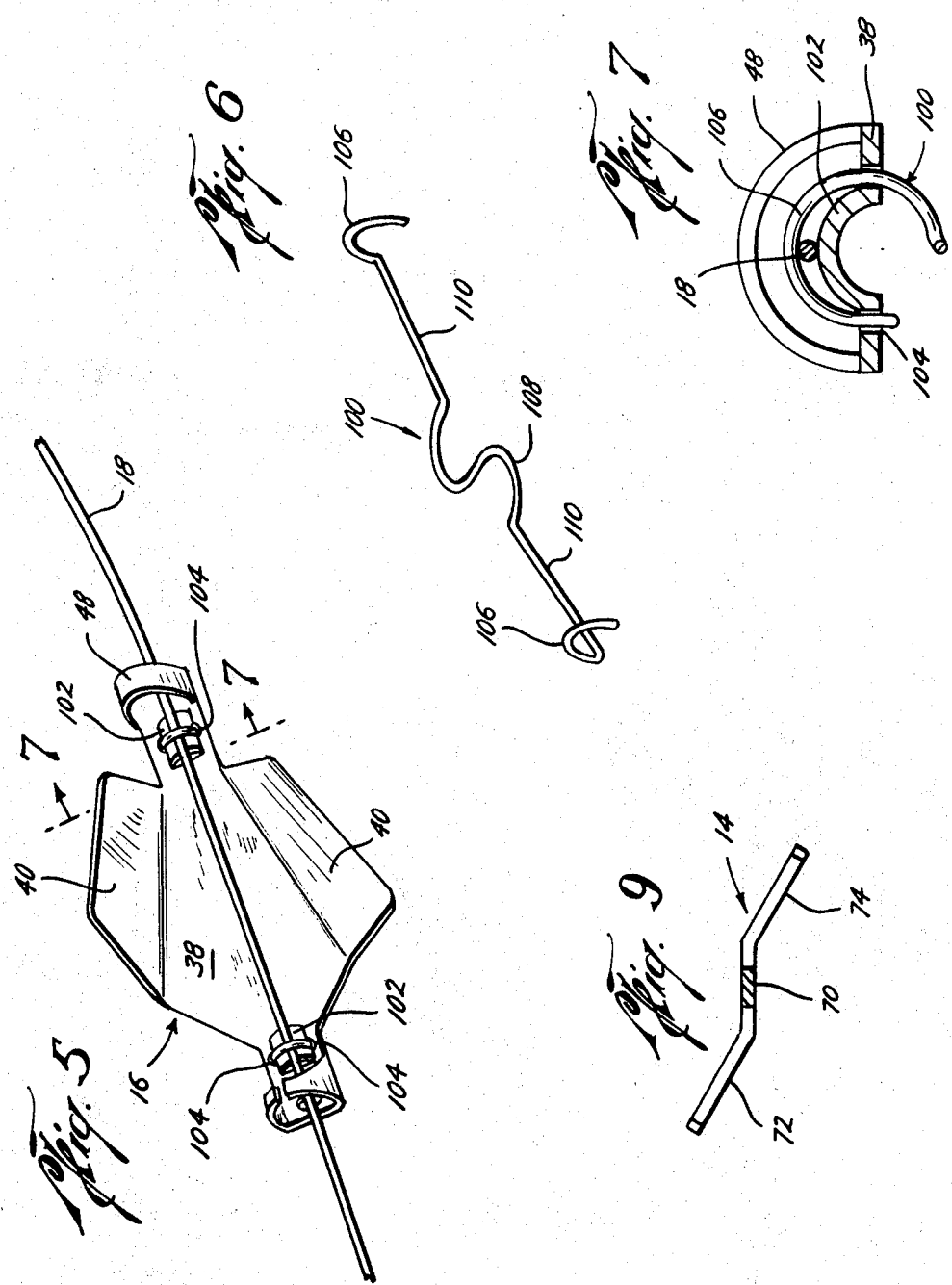

United States Patent Office 3,529,376
Patented Sept. 22, 1970

3,529,376
ACTIVATOR FOR FISHING LURES
Joseph Parmeson, 4821 Linden, Bellaire, Tex. 77401
Filed July 19, 1968, Ser. No. 746,144
Int. Cl. A01k 85/00
U.S. Cl. 43—42.06
16 Claims

ABSTRACT OF THE DISCLOSURE

An activator to be utilized by fishermen to give lifelike action to fishing lures as they are moved through the water and is comprised essentially of a turning blade assembly which is attached to one side of a swivel. This assembly imparts movement to the leader attached also to the swivel or to the activator itself, which in turn rotates the lure. A sabilizer blade assembly is connected to the other segment of the swivel to prevent rotation of the line leading to the fishing rod. Various designs and arrangements are employed for the activator and its various parts.

BACKGROUND OF THE INVENTION

As is well known among fishermen, it is quite often desirable to use a variety of lures when fishing in different locations and under varying conditions. Such changes in conditions and locations can bring about better results simply by a minor change in lure. Color, shade, brightness, size and the movements of the lure used can all affect the outcome of a day's lshing. Prior to the present invention, it has quite often been very difficult, especially when in a rocking boat to change lures as quickly and as often as desired.

Further, when using a lure which duplicates the appearance of live bait, such as shrimp, frogs, minnows, grasshoppers, squid and different kinds of worms, all in many sizes and colors, it is desirable to produce a rolling, wobbling, erratic lifelike motion in the lure as it moves through the water so that it closely resembles its live counterpart. Prior to the present invention, it has been necessary to jerk the fishing rod from side to side and to reel the lure in at various speeds in order to achieve anything near a simulated natural motion of the live bait in the water. Furthermore, such erratic movement of the lure makes them more noticeable in the water. This, in connection with the more lifelike and natural action, tends to attract fish more readily.

Prior art devices similar to the present invention utilize a "spinner" which is made as a part of each individual lure. The spinner tends to attract fish but does not give the natural lifelike action desired. Furthermore, since the spinner is positioned closely adjacent the lure itself, the fish are quite often likely to strike the spinner rather than the portion of the lure carrying the hook, due to the fact that it is the spinner that is most noticeable part of the lure. By striking the spinner, the fish will quite often miss the hook and not be caught. Furthermore, since the metal or plastic spinnner portion will feel unnatural to the fish, he will not return for a second strike.

In spite of the above disadvantages, under certain conditions, a lure carrying a spinner is desirable and will obtain satisfactory results. In prior art devices, the spinner is made as part of the lure. Thus, it is necessary to have a complete set of lures each carrying its own spinner in order to achieve the versatility desired under changing conditions. The addition of a spinner to the various lures will, of course, increase their costs.

These spinners have a further disadvantage in that they quite easily become entangled in seaweed and other types of underwater growth, as well as other debris found on or near the bottoms of the various bodies of water.

SUMMARY OF THE PRESENT INVENTION

The present invention overcomes or eliminates the above-mentioned disadvantages, as well as produces a number of other advantages, by the use of an activator for fishing tackle. This activator acts on the leader which leads to the lure and is not connected to, nor need it be located near, the lure itself. The main element of the activator is a turning blade assembly which has upstanding blades which, when pulled through the water, cause the assembly to rotate. This assembly is connected to a first segment of a swivel, the second segment of the swivel being the portion connected to the fishing line leading to the rod. A stabilizing blade assembly is attached to the second segment of the swivel and is designed to provide countertorque to any twisting action transmitted to the fishing line by friction in the swivel.

The leader is connected either to the swivel, to the turning blade assembly or to the connecting means attaching the assembly to the swivel. Accordingly, the rotation of the turning blade assembly will produce a rotation in the leader which will be imparted to the lure.

Means have also been devised in connecting the various parts of the activator together, and one embodiment incorporates an elongate pin used both to connect the leader and to connect the activator to the swivel. This pin is designed so as to allow fishermen to open and close it with one hand easily and quickly. Another embodiment utilizes clamping means on the turning blade assembly so that the assembly can be slidably fastened to the leader itself, and thereby be adjustable relative to the lure and swivel.

Various other features have also been incorporated into the activator of the present invention including an adjustable connection for the swivel to the turning blade assembly, a protector guide and extension therefor to insure against foul-ups of the leader with the activator. Due to the means of attaching the activator, lures can be quickly and easily changed as desired or when necessitated by a hook becoming lodged in the throat of a fish, whereupon it can be more easily removed. The design of the activator is such that it will not become easily snagged on undergrowth and other objects in or near the water. This assembly also allows a plurality of leaders and baits to be used.

In addition to the above, the present invention provides a small and simple device to manufacture and use. It may be manufactured economically and the one activator may be used with any number of different lures and/or lure arrangements. It provides increased safety for the fishermen and bystanders, as well as decreases the possible confusion in changing and replacing tackle. In short, it makes the fishermen's equipment more versatile and gives a more lifelike effect to the simulated lures used by today's fishermen.

It is, therefore, an object of the present invention to provide a fishing lure activator which is easy and economical to manufacture and to use.

Another object is to provide such an activator which can be used interchangeably with any number of lures and in any type of water and will impart a lifelike movement to lures when they are moved through the water.

Yet another object is to provide such a device that will allow rapid and easy change of lures with little danger of injury to the user or to bystanders.

Another object is to provide such a device which will develop the twisting movement of the leader necessary to impart the desired lifelike motion to the lures, yet will not twist the line leading to the rod.

Still another object is to provide such an activator which will lessen the likelihood of snagging and foul-ups by preventing movement of the lure to the activator assembly and by incorporating a design such as to lessen the possibility of snagging on objects on the bottom, brush and the like.

An additional object is to provide an activator which will impart a lifelike movement to lures to enhance the attractiveness of the lures without detracting therefrom by appearing and tasting artificial to fish.

Another object is to provide such a turning blade assembly which will impart the lifelike movement to the lures without the necessity of being positioned near the lures, and accordingly, thereby possibly interfere with the hooking and unhooking of the fish.

Yet another object is to provide such a device which will provide the safety of a "two-line" arrangement, as well as eliminate much of the need for handling the hook bearing lures by the user.

Other and further objects, features and advantages will be apparent from the following description of the presently preferred embodiment of the invention, given for the purpose of disclosure and taken in conjunction with the accompanying drawings.

BRIEF DESCRIPTION OF THE DRAWINGS

Like character references designate like parts throughout the several views of the drawings, which are as follows:

FIG. 1 is a perspective view of one embodiment of the present invention,

FIG. 2 is a perspective view of the connecting pin used in the embodiment of FIG. 1, FIG. 3 is a perspective view of a second embodiment of the present invention, FIG. 4 is a perspective view of a third embodiment of the present invention, FIG. 5 is a perspective view of yet a fourth embodiment of the turning blade assembly of the present invention, FIG. 6 is a perspective view of the spring clamping member used with the embodiment of FIG. 5, FIG. 7 is a partial section view taken along section line 7—7 of FIG. 5, FIG. 8 is a top, section view of the stabilizer blade assembly shown in FIG. 1, and taken along section line 8—8 of FIG. 1, FIG. 9 is a top section view of the stabilizer blade assembly shown in FIG. 3 and taken along section line 9—9 of FIG. 3, and FIG. 10 is a partial section of a turning blade assembly taken along section line 10—10 of FIG. 3.

BRIEF DESCRIPTION OF THE PREFERRED EMBODIMENTS

Turning to FIG. 1, one of the preferred embodiments of the present invention will now be described. Each of the embodiments are made up basically of the same elements: the fishing line 10, the swivel unit 12, the stabilizing blade means 14, the turning blade assembly 16, the leader 18 and the lure 20. In this embodiment, two leaders 18 and 18a are utilized with two lures 20 and 20a.

Discussing now the swivel used in this embodiment, it is made up of two segments 22 and 24. The segment 22 is in the shape of a yoke or bail and has a plurality or series of openings 26. The second segment 24 of the swivel unit 12 connects with the first segment 22 by means of the neck 28 extending through an opening in the yoke 22 and having an enlarged head (not shown) on the opposite side. This allows free swiveling movement yet prevents disengagement or disconnection of the two swivel segments. The segment 24 has a looped portion 30, whereby the fishing line 10 may be tied thereto. A segment of this loop is flattened, as at 32, and the stabilizing assembly 14 is connected at this point.

Turning now to the stabilizing assembly and referring also to FIG. 8, this particular embodiment is stamped from a single sheet of material and bent to form two blade surfaces 34 and 36. The sheet material making up the stabilizing assembly is then bent over and clamped to the flattened swivel portion 32, thereby securely fastening the stabilizer to the swivel. As is best seen in FIG. 8, the blade 36 is curved so as to resist the flow of water moving past it, while the blade surface 34 is flat and parallel to the flow of water.

Returning now to FIG. 1 and discussing the activator or turning blade assembly itself, it is comprised of an essentially flat sheet or plate 38 of any suitable material such as aluminum, plastic, etc. Turning blades 40 extend outwardly from the opposed surfaces of the plate 38. As can be seen from an examination of FIG. 1, these blades 40 are positioned at an angle, whereby they converge toward the rear of the assembly. Ports or windows 42 are positioned in the plate along with a first series of openings 44 and a second series of openings 46. The openings 44 are blocked in FIG. 1 by the segment 22 of the swivel but can be seen in FIG. 3. The leading edges 52 of the plate 38 are tapered outwardly and rearwardly to decrease the possibility of snagging the activator while fishing with it.

A protector guide 48 is located at the rear of the turning blade assembly and a flexible cylindrical extension 50 is fixedly attached to the guide 48 and extends rearwardly therefrom. This extension 50 may be a coil spring or a flexible tubing of any suitable material such as plastic or rubber, and may be attached to the guide 48 by means such as soldering, brazing, welding or clamping. The portion 49 of the assembly is usually curved on all of the embodiments to give needed additional strength to this rearwardly extending part of the plate. Without this or other suitable means to strengthen the portion 49, it could easily be bent out of alignment with the rest of the assembly.

To connect the various elements of the present invention, the embodiment of FIG. 1 utilizes an elongate pin 54 which is shown in greater detail in FIG. 2. This pin has a first link 56 having an offset portion 58 located therein. Two uprights 60 and 62 are positioned at each end of the first link and a second link 64 is hinged on the upright 60. A hook 66 is located on the uppermost end of the upright 62 and is used to lock the pin in a well known manner, and as is shown in FIG. 1.

In assembling the tackle arrangement shown in FIG. 1, the desired opening 26 in the swivel and opening 44 near the front or first end of the turning blade assembly 16 are positioned over one another, and the free end 68 of the connecting pin 54 is inserted through them. The pin is then manipulated until the free end can be moved through the suitable opening 46 corresponding to the opening 44 utilized in this makeup arrangement. The leader loops 19 are then passed over the free end 68 of the pin 54, and the free end is then snapped under the hook 66. The arrangement shown in FIG. 1 is now assembled and ready for use.

The advantages flowing from the use of the present invention are numerous and will now be discussed.

When the lures are reeled in or are trolled, the action against the angled blades 40 will cause the turning blade assembly of FIG. 1 to rotate in the direction of the arrows A shown in FIG. 1. This rotation will in turn cause a similar rotation in the leaders 18 and 18a, thus causing erratic movement of the lures. Since the lures are not being directly rotated, but instead the leader, the movement of the lures is not simply a rotating movement but is instead an erratic, wobbly movement partially caused by the flexible nature of the leader. This gives a much more lifelike action to the various lures, which is more attractive to the fish. As can be seen in FIGS. 1 and 4, a number of lures can be used with one assembly and the same lifelike action will be imparted to them. It is also understood that the assembly 16 can be made to rotate in either direction by reversing the blades 40.

To aid in producing the desired lifelike movement it is often helpful to insert a wire into any soft bait or lure and bend the wire as desired. This gives an irregular shape to the bait which produces a more satisfactory movement in the water. This can be achieved by inserting wire through the entire length of the lure, or at selected places and is especially effective on artificial worms which otherwise tend to move straight through the water, rather than wiggle.

It is, of course, undesirable that the line 10 be rotated since this will cause a twisting of the fishing line which will result in konts and kinks and subsequent foul-ups. It is for this purpose that the swivel 12 and stabilizer 14 are used. Since the segment 22 of the swivel will rotate independently of the segment 24, most of the rotation caused by the turning blade assembly 16 is not transmitted to the line 10. Due to friction in the swivel, however, a certain amount will be. Water contacting the curved blade surface 36 of the stabilizer, however, will tend too rotate the line 10 in the direction onpposite the direction of rotation of the turning blade assembly 16. By adjustment of this blade 36, this counter-torque may be adjusted as necessary to provide the proper amount of counter-torque. By use of the flattened portion 32 on the swivel section 24, the stabilizer is more securely and firmly attached to the swivel. It must be fixedly attached to the swivel segment 24, of course, to give proper operation.

The flat surface 34 is parallel to the path of travel of the stabilizer. Water flowing past this flat surface will maintain the segment 24 of the swivel in line with the segment 22. Without the blade 34, the force exerted against the blade 36 will tend to move the swivel segment 24 at an angle to the segment 22, and thus have motion at an angle to the direction of pull (fishtailing). This is undesirable and results in increased wear on the neck 28, which will eventually break and separate the two swivel sections. An additional advantage flowing from the straight surface 34 is that the size and weight of the stabilizer can be decreased substantially. Absent such a straight surface too counteract the tendency of the swivel to move out of alignment, a rather large and heavy stabilizer is required. This has the obvious advantages of decreasing the material needed, the weight and the visibility to fish of this particular part of the tackle.

As will be readily understood, since the blade surfaces are made of malleable material, the blade 34 may be made into the curved surface and the blade 36 straightened. In like manner, the curvature of the blades may be varied to give the exact amount of counter-torque required. For this reason, this stabilizer assembly will provide the proper counter-torque regardless of the direction of rotation of the turning blade assembly and for a wide range of sizes of such assemblies. Since the speed of rotation varies directly with the speed of the retrieve, as does the counter-torque, the counter-torque will automatically adjust to compensate regardless of the speed at which the lure is brought in or trolled once the stabilizer is properly adjusted.

The use of the connecting pin 54 allows the turning blade assembly to rotate relative to the swivel segment to aid in giving somewhat erratic movement to the lures. Further variety in the movement that may be caused by use of the present invention is achieved by the use of a plurality of openings, 44 on the plate and 26 on the swivel. Use of these openings provides a number of points of connection for the swivel to the plate, changes in which change the action produced in the lure. This also permits a large number of adjustments to be made to compensate for different weights of bait and other tackle, and to prevent buckling or stalling by changing the leverage on the blades of the activator. Of course, an opening 46 must be spaced from each opening 44 by a distance equal to the length of the pin 54.

Turning now to pin 54, it is designed to be snapped open or closed with one hand. This is accomplished by the offset 58 which contacts the plate 38 and prevents the pin from rotating or twisting while being opened or closed. The pin, rather than the blade assembly 16, is the most likely portion to become bent or damaged, and it may be easily replaced in a few seconds and at small cost to the user. Furthermore, the use of this pin allows for quick change of swivels, turning blade assemblies and, of course, lures. It should be noted that the stress imposed on the pin is mostly shear, a fact which greatly increases the strength of any given size pin. The pull caused by the lure and hooked fish is on the lower part of the upright 60 which contacts the opening 46 through which it extends, thereby causing the shear stress. Use of this pin eliminates the use of rivets, links or slip rings to connect the swivel, thus decreasing the amount of time necessary to connect and disconnect the tackle assembly.

Another advantage of the pin connection with the swivel is that it permits the swivel to freely rotate or oscillate in a plane parrallel with the plane formed by the flat plate 38. This aids in providing a more lifelike movement to the lures, as well as in preventing foul-ups or snagging on objects in or near the water. Another feature aiding in the preventing of such snagging problems is the rearwardly and outwardly taper of the leading edges 52 of the plate 38.

As the turning blade assembly rotates, the flat plate 38 will encounter a substantial amount of resistance by the water against this rotation. To help decrease this resistance, the ports or windows 42 are placed in the plate, thereby decreasing the amount of surface area. This also decreases the amount of material needed to produce the assembly, with a corresponding reduction in its weight. The reduction in surface area also decreases the visibility in the water as well as reflections, thus decreasing the possibility of distracting the fish from the bait.

The protector guide 48 at the rear of the assembly performs a very important function in the performance of the activator. The leader extends through this guide and it keeps the leader away from the activator blades, thus preventing possible foul-ups with the leaders and the lures. It also prevents such foul-ups during casting by keeping the leader extending away from the assembly 16. An additional advantage results when a fish is hooked. Regardless of the direction of movement of the fish, the pull on the pin 54 by the leader will always be in a straight line relationship with the pin, thus maintaining the line of pull along the strongest axis of the combination. Furthermore, when reeling or trolling the lure, the leader extending through the protector guide helps to stabilize the rear end of the activator.

The extended protector guide 50 provides extra protection against the above-mentioned disadvantages, and is especially helpful when fishing in fast moving water by preventing the leader from overrunning the activator. This same condition may, of course, be encountered when a fish is hooked and reverses its direction to move toward the fisherman faster than he is retrieving his line. The length of the extension 50 may be made to suit the conditions under which it is used.

Turning now to FIG. 3, a second embodiment of the present invention will be discussed. The swivel in this embodiment is a well-known prior art swivel and is comprised, once again, of the two segments 24 and 22, which rotate independently of each other. Once again, the flattened portion 32 is used to connect the stabilizer 14. This stabilizer is made up of a single sheet of material and has a central connecting portion 70, a forwardly extending blade surface 72 and a rearwardly extending blade surface 74. This stabilizer is more clearly shown in FIG. 9. As before, water striking the exposed blade surfaces 72 and 74 will tend to rotate this stabilizer in the direction opposite the rotation of the assembly 16, thus providing the necessary counter-torque. Also, as before, the blades are of a malleable material, whereby their configuration may be changed as desired.

In the embodiment of FIG. 3, the swivel 12 is connected to the turning blade assembly 16 by means of a clasp 76 which is well known in the prior art. This clasp may be attached to any of the openings 44 in order to improve stability and performance when using baits. This clasp is also used to secure the loop 19 for the leader 18. This arrangement eliminates the pin 54, although it may, of course, be utilized if desired, and permits a quicker change of leader and bait. Once again, the force exerted on the clasp 76 is a shear force and due to the protector guides 48 and 50, the pull on the clasp 76 is always in a straight line pull extending along the longitudinal axis of the assembly.

One change in the structure of the turning blade assembly in the embodiment of FIG. 3 is the use of the water scoops or foils 80. These foils are extensions of the leading edge of the plate 38 and extend outwardly therefrom and at an angle to the plates. The angle is such that the plates are, in effect, positioned on the opposite side of the plate 38 from the turning blade 40 to which they are adjacent.

The operation and advantages of this embodiment are essentially the same as with the last embodiment, with the exception of the operation and advantages of the pin 54. One other exception is the foils 80 extending outwardly and downwardly as is best shown in FIG. 10 to force water that would normally flow under plate 38 and thereby not contact the turning blade 40, up and into contact with the turning blade. In this manner, the pressure or force exerted against the turning blade by the movement of the activator through the water is increased, thereby aiding in the rotation of the assembly. At the same time, the amount of water flowing beneath the turning blade assembly is decreased, thus decreasing the amount of pressure or resistance exerted against the plate 38 tending to prevent the rotation of the turning blade assembly. Thus, a more efficient assembly 16 is presented to achieve a faster rotation, or in the alternative, more rotation at a slower rate of trolling or reeling in of the line without increasing the overall dimensions.

Turning now to FIG. 4, another embodiment will be described. In this embodiment, the swivel 12 and clasp 76 are the same as that shown in FIG. 3 and the stabilizer is the same as that in FIG. 1. In this embodiment, the leader 18 is connected directly to the clasp 76 as is a second leader 18a.

Spaced openings 82 are located on the plate 38 to receive nut and bolt means 84, which are used to secure a clamp 86 (the openings being hidden by the clamp 86). A front cylindrically shaped portion 88 similar to the protector guide 48 is located on this embodiment and receives resilient bushing 90 having a slot 92 extending throughout its length and substantially the entire length of its cross-section. A wedge 94 may also be used in the protector guide 48. Located at the end of the leader 18 is a second clasp 96 to which is attached the lure 20 and a weight 98.

In operation, the function of the arrangement in FIG. 4 is the same as in the previous embodiments. The only difference here is that the turning blade assembly 16 is slidably secured to the leader 18 rather than being attached to the swivel in a manner fixed relative to the swivel and the bait. Accordingly, the assembly 16 can be moved closer to or away from the swivel 12, and of course, the lure 20. No strain is placed on the activator when a fish is being pulled in, the leader being connected directly to the swivel. In the preferred embodiment, only the bushing 90 and, if desired, the wedge 94 are used to attach and position the assembly 16 on the leader. The clamp member 86 is provided as a modification to be used especially with a wire leader to increase the frictional clamping action. If desired, the activator may, of course, be secured to a metal leader by soldering, brazing, etc., as well as by clamping.

As will be noted in this embodiment, one lure 20a is connected directly to the swivel and in front of the assembly 16. Rotating motion will be imparted to it, however, due to the fact that the clasp 76 will also be rotated. This is especially useful when one desires to fish both close to the bottom by use of the sinker 98 and lure 20 and above the bottom by use of the lure 20a. Such combinations may, of course, be employed with the other embodiments disclosed herein.

Turning now to FIG. 5, a modification of the embodiment of FIG. 4 is shown. This, once again, discloses a device which is mounted directly on the leader and maintained there by frictional contact. This assembly 16 is also adjustable in the same manner as with the last discussed embodiment. This embodiment, however, uses a spring member 100 made of spring steel or like material coacting with two upstanding abutments 102. These abutments are formed on the flat surface of the plate 38 and have openings 104 on either side thereof.

The spring member shown in FIG. 6 is an elongate member having two loops or hoops 106 at either end and a laterally offset portion 108 near its middle. The links 110 connecting the lateral offset 108 with the loops 106 actually extend or slope downwardly from the offset portion. Thus, when the loops 106 are inserted through the openings 104 to extend over the abutments 102, the laterally offset portion 108 is pressed tightly against the bottom of the plate 38. This, in turn, forces the loops 106 down against the abutments 102. As one will readily see, when the leader 18 is inserted between the loops 106 and the abutments 102, as is seen in FIGS. 5 and 7, the action of the offset portion 108 against the plate will provide very secure, although adjustable, clamping means due to the coaction of the abutments 102 and the hooks 106.

It is to be readily understood, of course, that various combinations of the elements disclosed herein may be achieved. For example, the extension 50 may or may not be used with any of the embodiments disclosed. Various swivels may be used with the different embodiments of turning blades, and the use of a plurality of leaders and the different manner and places of attaching them may be employed with any of the assemblies disclosed herein, as well as others that come readily to mind. It is the intent of the present disclosure to show only certain preferred embodiments, but the present invention is not intended to be limited to just the specific arrangements disclosed.

The advantages flowing from the combination described herein are many and a number of them have been set forth previously. These advantages apply generally to all of the embodiments and combinations disclosed. An activator for lures has been disclosed which produces a more realistic action than the previously known activators of this type. It is quite simple to manufacture and use as well as being economical to manufacture and especially economical to use. For example, one activator may be used with any lure, rather than providing as a part of a lure individual activators or spinners. This activator is not designed to catch fish itself, and accordingly, bears no hooks or other sharp corners that may become readily snagged or caught on foreign objects. Also, since it is not designed to attract the fish, it may be made from a suitable material, or painted to blend into the background and not be a reflective object. This will prevent the fish from striking at a strange object which will taste abnormal or unlike food, whereupon the fish will not return for a second strike. Since it is removed from the bait or lure, there is little possibility of the fish being attraced to the activator. This remote location of the activator also prevents it from interfering with unhooking caught fish.

The activator has been so designed as to provide more than adequate rotation to the leader to produce the desired action in the lure and to possess the strength required when hauling in fish. At the same time, the device has been made relatively small, light and requiring little material. It may, of course, be made of varying sizes to be used with the largest of deep-sea tackle to small tackle used in back-water fishing. It has been so designed as to place the stress on the activator in such a manner that it can best carry such stress.

The present invention, therefore, is well adapted to carry out the objects and obtain the ends and advantages mentioned, as well as others inherent therein. While presently preferred embodiments of the invention have been given for the purpose of disclosure, numerous changes in the detail of construction, the combination, shape, size and arrangement of parts may be resorted to without departing from the spirit and scope of the invention.

What is claimed is:

1. An activator for use with a fishing line, stabilizer means to prevent twisting of the fishing line, a swivel and a leader with a lure connected to one end thereof, and comprising,
   a substantially flat plate having opposed surfaces and a longitudinal axis extending between first and second ends,
   a turning blade upstanding from each of said surfaces and positioned on opposite sides of and at an angle to, the longitudinal axis so as to converge toward the second end of the plate,
   said swivel including first and second segments rotatable relative to each other,
   means for operatively connecting the first segment of the swivel and the plate and for connecting the leader to the activator so that it extends over the second end of the plate, the one end of the leader lying beyond the said second end of the plate.
   the second swivel segment providing means for connection to the fishing line, and
   a protector guide at the second end of the plate for the leader to extend through.

2. The invention of claim 1 and further including,
   a flexible, cylindrical extension secured to said protector guide and extending outwardly away from said plate, for the leader to pass through.

3. The invention of claim 1 and including a water foil on the leading edge of the plate adjacent each of said turning blades and extending forwardly from said leading edge and at an angle to said plate, said angle being such as to position each foil on the side of the plate opposite its adjacent flange.

4. The invention of claim 1 and including ports in said plate to decrease the resistance of the water to the rotation thereof.

5. An activator for use with a fishing line, stabilizer means to prevent twisting of the fishing line, a swivel and a leader comprising,
   a substantially flat plate having opposed surfaces and a longitudinal axis extending between first and second ends,
   a turning blade upstanding from each of said surfaces and positioned on opposite sides of and at an angle to, the longitudinal axis so as to converge toward the second end of the plate,
   said swivel including first and second segments rotatable relative to each other,
   means for operatively connecting together the swivel, the plate and the leader,
   the second swivel segment providing means for connection to the fishing line.
   a protector guide near the second end of the plate for the leader to extend through,
   said connecting means being further defined as including,
      at least one opening in the first segment of the swivel,
      at least one opening near the first end of said plate,
      said connecting means being a pin releasably secured in said openings.

6. An activator for use with a fishing line, stabilizer means to prevent twisting of the fishing line, a swivel and and a leader comprising,
   a substantially flat plate having opposed surfaces and a longitudinal axis extending between first and second ends,
   a turning blade upstanding from each of said surfaces and positioned on opposite sides of and at an angle to, the longitudinal axis so as to converge toward the second end of the plate,
   said swivel including first and second segments rotatable relative to each other
   means for operatively connecting together the swivel, the plate and the leader,
   the second swivel segment providing means for connection to the fishing line,
   a protector guide near the second end of the plate for the leader to extend through,
   said connecting means including
      a first plurality of openings on the first segment of the swivel, and
      a second plurality of openings near the first end of the plate,
      said connecting means being a pin releasably engaged in an opening from each of said first and second pluralities of openings for connecting the plate to the swivel.

7. The invention of claim 6 and further including,
   a third plurality of openings in said plate but removed from said second plurality, the second and third pluralities lying along said longitudinal axis,
   said pin being further defined as including,
      a first length, including
         a first offset portion in said first length lying in a first plane,
         first and second spaced uprights extending from said first length generally perpendicular to the first plane,
         a second length extending from the first upright generally toward the second upright,
         engaging means on said second upright for engaging the second length,
         one of said uprights extending through one of said third plurality of openings, and
         the other of said uprights extending through an opening from each of said first and second pluralities.

8. An activator for use with a fishing line, stabilizer means to prevent twisting of the fishing line, a swivel and a leader comprising,
   a substantially flat plate having opposed surfaces and a longitudinal axis extending between first and second ends,
   a turning blade upstanding from each of said surfaces and positioned on opposite sides of and at an angle to, the longitudinal axis so as to converge toward the second end of the plate,
   said swivel including first and second segments rotatable relative to each other,
   means for operatively connecting together the swivel, the plate and the leader,
   the second swivel segment providing means for connection to the fishing line,
   a protector guide near the second end of the plate for the leader to extend through,
   said connecting means further including,
      a first series of openings in said first swivel segment,
      a second series of openings in the plates near its first end,
      a third series of openings in the plate spaced from the second series,
      an elongate pin, one end of said pin being releasably engaged in an opening from each of said first and second series, and the other end of the pin being releasably engaged in an opening from said third series, and clasp means to secure the pin in said engaged openings.

9. The invention of claim 1 wherein said leader is attached to the first swivel segment by clasp means, and means for slidably and releasably securing the plate to the leader.

10. The invention of claim 1 wherein the connecting means is further defined as, clamp means on said plate for slidably securing the plate to the leader in a releasable manner.

11. The invention of claim 10 wherein the clamp means is defined as including, two spaced abutments, a spring member biased toward said abutments to provide a clamping action to slidably secure the plate on the leader.

12. The invention of claim 9 wherein the securing means is further defined as wedge means for slidably securing the plate to the leader in a releasable manner.

13. An activator for use with a fishing line, a swivel and a leader with a lure connected to one end thereof, and comprising, a substantially flat plate having opposed surfaces and a longitudinal axis extending between first and second ends, a turning blade upstanding from each of said surfaces and positioned on opposite sides of and at an angle to, the longitudinal axis so as to converge toward the second end of the plate, said swivel including first and second segments rotatable relative to each other, means for operatively connecting together the swivel, the plate and the leader, the second swivel segment providing means for connection to the fishing line, and stabilizer means fixedly attached to the second swivel segment for countering torque exerted on the fishing line by the activator, said stabilizer means being defined as including, a leading edge, a first surface extending rearwardly from the leading edge and being essentially flat, and a second surface extending generally rearwardly from the leading edge and being curved away from the first surface, the concave portion of the curved section surface facing away from the first surface.

14. The invention of claims 1 wherein the stabilizer means is further defined as including, a centrally disposed attachment portion for connection to the second swivel segment, a first blade extending outwardly from one edge of the attachment portion, a second blade extending outwardly from the edge of the attachment portion opposite said one edge, said blades being malleable whereby their configuration may be changed if desired.

15. A stabilizer for use with spinning fishing lure means comprised of, a first blade surface being essentially a straight surface parallel to the path of travel of the stabilizer, and a second blade surface being curved, the concave portion of the curved surface extending generally in the direction of travel of the stabilizer.

16. The invention of claim 15 wherein the blade surfaces are comprised of a malleable substance whereby their configuration and position relative to each other can be changed.

References Cited

UNITED STATES PATENTS

| 1,589,522 | 6/1926 | Felix | 43—43.15 |
| 2,577,143 | 12/1951 | Midland | 43—43.15 X |
| 2,700,843 | 2/1955 | Werner | 43—44.83 X |
| 2,895,253 | 7/1959 | Hess | 43—43.51 X |
| 3,257,750 | 6/1966 | Shannon | 43—42.06 |

SAMUEL KOREN, Primary Examiner

D. J. LEACH, Assistant Examiner

U.S. Cl. X.R.

43—42.16, 42.51, 43.13, 43.15, 44.83